Nov. 14, 1939.　　　　E. H. KREMER　　　　2,179,697
BELT CONNECTOR
Filed Jan. 10, 1938　　　　2 Sheets-Sheet 1
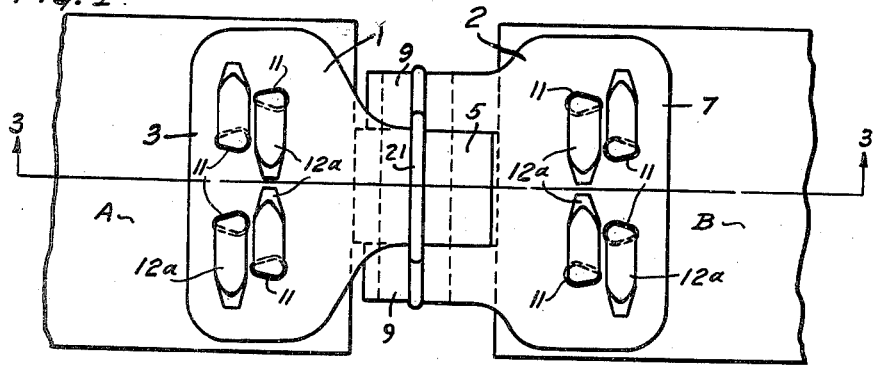
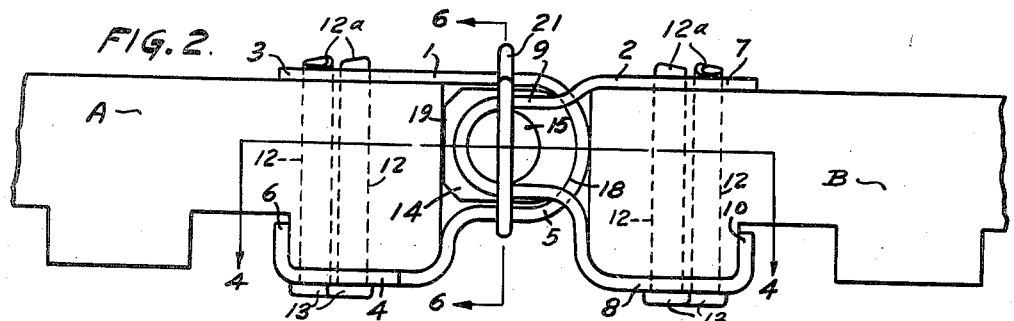
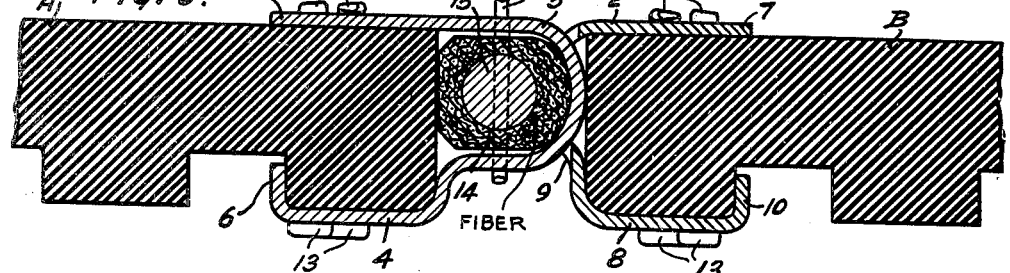
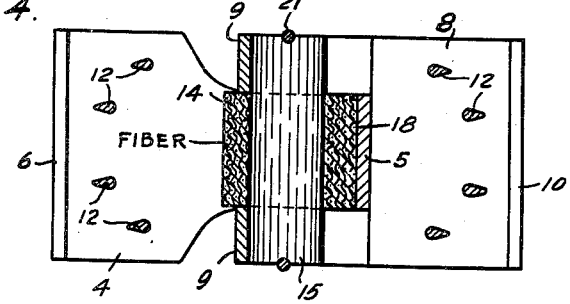
INVENTOR
EDWARD H. KREMER.
BY Toulmin & Toulmin
ATTORNEYS.

Nov. 14, 1939.　　　　　E. H. KREMER　　　　　2,179,697
BELT CONNECTOR
Filed Jan. 10, 1938　　　　2 Sheets-Sheet 2

INVENTOR
EDWARD H. KREMER
BY Toulmin & Toulmin
ATTORNEYS

Patented Nov. 14, 1939

2,179,697

UNITED STATES PATENT OFFICE 2,179,697

BELT CONNECTOR

Edward H. Kremer, Dayton, Ohio, assignor to The Dayton Rubber Manufacturing Company, Dayton, Ohio, a corporation of Ohio Application January 10, 1938, Serial No. 184,197

11 Claims. (Cl. 24—33)

This invention relates to belt connectors and, in particular, to connectors adapted for use in connecting the ends of power transmission belts.

It is an object of this invention to provide a belt connector of the single bearing type of such construction that portions thereof may be permanently secured to the ends of a power belt, remote from the place of use, and thereafter assembled into an articulated belt connector structure after the belt is placed in operative position.

It is a further object of this invention to provide, in such construction, means including a removable center pin and spring yoke center pin retaining means for removably securing the center pin in operative relation, and against accidental removal, with great ease and facility.

It is a further object of this invention to provide, in a belt connector, a pair of complementary strap members, and means including a bearing bushing and an associated connector pin for pivotally connecting said members together.

It is a further object of this invention to provide for cooperation with the above-described structure spring yoke means adapted for cooperation with grooves, or surfaces, in one of the complementary strap members and in the center pin for removably securing the center pin in the connector assembly against accidental displacement therefrom.

It is a further object of this invention to provide improved means for securing the connector strap members to the belt ends without destruction of the continuity of the belt end portions.

It is a further object of this invention to provide such means comprising headed nail members of tapered cross section adapted to cooperate with complementary aperture means in the connector strap members for securing the nail members thereto, against rotary movement with respect thereto.

It is a further object of this invention to provide such penetrating nail means which is so disposed with respect to the belt ends that the thicker surface thereof shall be disposed toward the direction of the application of stress within the belt in order to prevent tearing of the belt.

These and other objects and advantages will appear from the following description taken in connection with the drawings.

In the drawings:

Figure 1 is a fragmentary top plan view of a belt equipped with a connector according to the principles of this invention;

Figure 2 is a side elevational view of the structure shown in Figure 1;

Figure 3 is a longitudinal section taken on the line 3—3 of Figure 1;

Figure 4 is a section taken substantially on the line 4—4 of Figure 2, with the center pin of the connector shown in plan;

Figure 5:
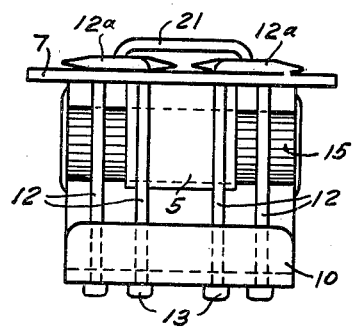
Figure 5 is an end view, in elevation, of the connector shown in Figures 1 to 4, with the belt omitted therefrom, as seen from the right end of the connector looking toward the left in Figures 1, 2, 3 and 4.

Referring to the drawings in detail, the connector assembly includes a pair of complementary strap members 1 and 2 adapted to be secured respectively, each at one of the ends of a power transmission belt. The strap member 1, which is the male strap member, is provided with a substantially flat upper or outer flange 3, a somewhat similar lower or inner flange 4 and an intermediate loop portion 5. At the end of the lower or inner flange 4 is a turned up flange 6 directed toward the flange 3 and adapted to be disposed in the space between adjacent teeth of a belt structure adapted to be connected by the belt connector.

The strap member 2 is provided with an upper or outer flange 7 similar to and corresponding to the flange 3 of the strap member 1, a lower or inner flange 8 corresponding to the flange 4, and a pair of transversely separated loop portions 9 corresponding to the single loop portion 5 of the strap member 1 and adapted to have the loop portion 5 disposed therebetween, as shown in Figure 1. The flange 8 of the strap member 2 is provided with a flange portion 10 which corresponds with the flange portion 6 of the inner or lower flange 4. The flanges 3 and 4 of the male strap member 1 are provided with suitable, aligned apertures 11 of non-circular form. Similar aligned apertures 11 are provided in the flanges 7 and 8 of the female strap member 2. These apertures 11 are substantially tapered toward one end and are of substantial airfoil shape. The flange members 6 and 10 respectively are optional and are omitted where the strap members 1 and 2 are intended to be applied to belts unprovided with cogs or teeth, as illustrated in Figures 1, 2 and 3.

Each respective pair of aligned apertures 11 (Fig. 7) is adapted to receive a nail member 12 having an enlarged head 13. The cross sectional shape of the nails 12 is the same as the shape of the apertures 11. The enlarged heads 13 of the nails 12 engage the flanges 3 and 7 respectively to prevent downward or inward movement of the nails with respect to the strap members 1 and 2. These nails 12 of tapered section have sharp points, as shown in Figures 1, 2 and 3, and are adapted to be driven through the end portions A and B respectively of a belt to be connected by the belt connector, and the lower ends 12a of the nails are bent over to engage the inner or lower flanges 4 and 8 respectively, as shown in Figure 5, to permanently secure the respective strap members 1 and 2 to the corresponding belt ends A and B.

A type of belt for which the connector is particularly adapted is diagrammatically illustrated in Figures 1, 2 and 3; and in the section illustrated in Figure 4, the belt is omitted better to illustrate the details of the belt connector and the cross sectional shape of the nail members 12. This belt is of the toothed, side drive or cog belt type which is generally formed from a strip or strips of rubberized fabric rolled upon itself, vulcanized in a mold and then provided with teeth at its inner portion, or both the inner and outer portion.

For the sake of simplicity of illustration, the belt is illustrated in Figure 3 as formed entirely of rubber, but the particular construction of the belt itself is immaterial so far as concerns the belt connector of this invention, which is adapted for use with belts of various constructions.

Due to the particular construction of the belt connector of this invention, the male strap member 1 may be applied to the belt end A and the female strap member 2 may be applied to the belt end B, totally independently of interconnection of the respective strap members 1 and 2.

The means for providing hinged connection between the strap members 1 and 2 comprises the bearing bushing member 14 and center pin 15. The bearing bushing 14 is provided with a bore 16 extending therethrough and adapted to receive the center pin 15 which, though shown as solid, may be formed as a cylinder, or provided with a central longitudinal bore in order to reduce the weight thereof.

The center pin 15 is preferably formed of any suitable metal such as steel which is preferably provided with a smooth machined cylindrical surface and provided at each end with a transverse, radial screw slot 17 for a purpose which will hereinafter more clearly appear. The bearing bushing 14 may be formed of any suitable material such as metal, oil impregnated metal, or oil impregnated fiber or other composition adapted to provide a self-lubricating bearing surface for the center pin 15. The bearing bushing 14 is provided at one side with arcuate surface 18 particularly adapted for close engagement with the interior of the loop portion 5 of the male strap member 1.

Opposite this surface 18 is provided a substantially flat exterior surface 19 adapted for abutting engagement with the end of the belt portion A, as shown in Figures 2 and 3. The inner surface of the loop portions 9 of the female strap member 2 are adapted to be closely engaged by the cylindrical surface of the center pin 15, as shown in Figures 2 and 4. Due to the antifriction engagement between the center pin 15 and bearing bushing 14, the male and female strap members are secured together for free relative pivotal movement in such manner that the properties of the belt adjacent the connector are substantially the same as those remote therefrom.

In addition, when the bearing bushing 14 is formed of oil impregnated fiber, as illustrated, the resiliency of the material of the bushing 14 provides sufficient resiliency in the connector to cushion the relatively moving parts and reduce wear therebetween. Due to the disposition of the thick side portions of the nail members 12 toward the hinged connection, tearing of the belt body material adjacent these nails, under stress applied through application of power to the belt, is maintained at a minimum value, if not entirely prevented. In other words, the tendency for the occurrence of tearing of the end portions of the belt upon abrupt application of stress to the belt is substantially reduced due to the particular shape of the nail members 12. Furthermore, these nail members 12 will more readily penetrate the rubber containing belt body composition than if the nail members were of conventional, circular section.

Figure 7:
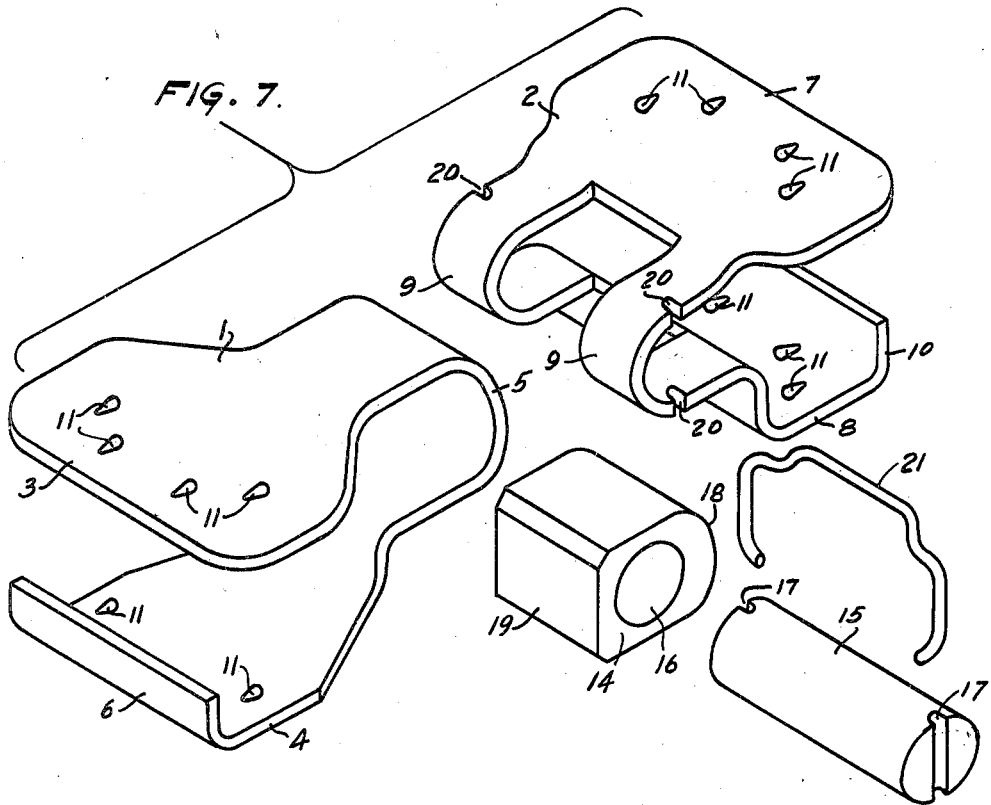
Figure 7 is an exploded view, in perspective, of a belt connector constructed according to the principles of this invention.

As will be most clearly understood from consideration of Figure 7 of the drawings, in order to connect the ends A and B of a belt having the male and female strap members 1 and 2 permanently secured thereto by means of nail members 12, it is merely necessary that the loop portion 5 of the male strap member 1 have the bearing bushing 14 inserted in the interior thereof and advanced to interpenetrating relation between the loop portions 9 of the female strap member 2 in such manner as to provide access for insertion of the center pin 15 in the bore 16 of the bearing bushing 14. This secures the strap members 1 and 2, and their connected belt ends A and B together in antifriction, hinged relation.

In order that accidental axial displacement of the center pin 15 should not occur, the female strap member 2 is provided with retaining slots 20 arranged in aligned pairs at the outside edge of each loop portion 9 thereof. For cooperation with these retaining slots 20, I have provided a spring yoke member 21 of substantial U-shape which is adapted to have its straight side portions each inserted through a pair of aligned retaining slots 20 and one of the end screw slots 17 of the center pin 15 which are each aligned with the respective pair of retaining slots 20, in such manner that relative rotation between the center pin 15 and the loop portions of strap member 2 is totally prevented.

Figure 6:
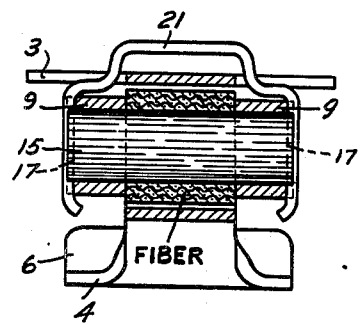
Figure 6 is a section taken on the line 6—6 of Figure 2.

The ends of these straight side portions of the spring yoke member 21 are preferably bent inwardly before attachment of the spring yoke member 21, as shown in Figure 7, in such manner that, when the straight side portions of the spring yoke member 21 closely engage the slots 17 in the center pin 15 to prevent relative axial movement between the center pin 15 and the female strap member 2, the bent end portions of the member 21 prevent radial displacement thereof. Alignment of the screw slots 17 and retaining slots 20 may be accomplished by the use of the spring yoke member 21 as a screw driver for this purpose; and after such alignment has been achieved, the spring yoke may be manually snapped in position. Alternatively, the end portions of the member 21 may remain unbent until after attachment, in which case the member is first placed in position and then the end portions thereof bent over, as shown in Figure 6, by the use of any simple tool such as a hammer, or a pair of pliers, or the like.

The spring yoke 21 may be formed of any suitable material and the shape thereof is susceptible of substantial variation. Instead of being formed circular in cross section, it may be formed of half round, rectangular or other non-circular section; and although the preferred constituent is phosphor-bronze, any other suitable material may be used.

In order to disassemble the belt connector, it is merely necessary that the spring yoke member 21 be removed from this position, which may be accomplished by the use of a pair of pliers, screw driver or any other suitable implement and thereafter the center pin may be driven axially out of the bore 16 of the bearing bushing 14 in such manner that the strap members 1 and 2 may be freely separated to disconnect the belt ends A and B.

The ease and facility of disassembly of the belt connector is an important feature of this invention because it makes possible the easy and convenient replacement of worn bearing bushings 14 and/or center pins 15, and as all wear occurring in the connector structure must occur within one or both of these members, full servicing or renewal of the belt connector may be accomplished by replacement of these two parts.

As stated above, the shape of the spring yoke member 21 is susceptible of considerable variation and, likewise, the position of the cooperating retaining slots 20 may also be changed, as desired. Furthermore, as a substitution for the spring yoke member 21, bendable projections may be formed integrally with the loop portions 9 of the female strap member 2, which may be engaged either with the screw slots 17 when disposed at the end of the center pin 15, as illustrated, or these slots may be replaced by suitably disposed annular slots formed in the cylindrical surface portion of the center pin 15. Also, as above explained, when it is desired that the weight of the belt connector may be maintained at a minimum value, a central longitudinal bore may be provided in the center pin 15 for reducing the weight thereof, or a hollow cylindrical pintle structure may be substituted for the solid center pin 15. Likewise, a plain or hollow center pin or pintle may be provided with a transverse hole at one, or both, ends and maintained in position by means of a cotter pin, or cotter pins, inserted therein.

It will be understood that the above described structure is merely illustrative of the manner in which the principles of my invention may be utilized and that I desire to comprehend within my invention such modifications as come within the scope of the claims and the invention.

Having thus fully described my invention, what I claim as new and desire to secure by Letters Patent is:

1. In a belt connector including a pair of strap members, said members engaging over the end portions of said belt and attached to the top and under surface thereof, means comprising a transverse center pin pivotally connecting said strap members together, and means for locking said center pin to one of said strap members comprising outer marginal slot means in said strap member, aligned transverse slot means in said center pin, and a yieldable yoke clamping means on said strap member having common engagement with said slot means.

2. In a belt connector including a pair of strap members, said members engaging over the end portions of said belt and attached to the top and under surface thereof, means comprising a bearing bushing and supported center pin connecting said strap members together, and means for locking said center pin to one of said strap members against axial and rotary movement comprising aligned slots in said strap member and said center pin and means clampingly engageable with said slots and removably spring yoke clamped to said strap member.

3. In a belt connector including a pair of strap members, means including a bearing bushing and supported center pin connecting said strap members together, and means for locking said center pin to one of said strap members against axial and rotary movement comprising aligned slots in said strap member and said center pin and yoke means removably clamped to said strap member and having common engagement with said slots.

4. In a belt connector including a pair of strap members, means including a bearing bushing and supported center pin connecting said strap members together, and means for locking said center pin to one of said strap members against axial and rotary movement comprising aligned slots in said strap member and said center pin and spring yoke means removably clamped about said strap member and extending through said aligned slots in said strap member and said center pin.

5. In a belt connector, a pair of strap members adapted for attachment to opposite ends of a belt and engaging therearound, means including an axially detachable transverse center pin for pivotally securing said strap members together, and means for retaining and locking said pin against displacement with respect to one of said strap members comprising a spring yoke clampingly engageable with the outer edges of said strap member and the opposite ends of said center pin, said spring yoke being removable for disconnecting said belt.

6. In a belt connector, a pair of strap members adapted for attachment to opposite ends of a belt, means including an axially detachable transverse center pin for pivotally securing said strap members together, and means for retaining and locking said pin against rotation with respect to one of said strap members comprising end screw slots in said center pin, slots in said strap member aligned with said screw slots, and a spring yoke removably clamped around said strap member and extending through said screw slots and engaging in said aligned slots.

7. In a belt connector including a pair of strap members with interengaging loop portions connected by bearing means and a center pin supported thereby and engaging the loop portions of one of said strap members; means to lock said center pin against rotation relative to said engaged strap member comprising aligned slot means in the outer opposite ends of said engaged loop portion and spring yoke means embracing said engaged loop portions, and resting in said aligned slot means, said spring yoke means being removably clamped in said slotted engaged loop portions.

8. A belt connector comprising strap members having interengaging loop means, means for pivotally connecting said loop means comprising a bearing bushing with a transverse bearing bore in the loop means of one strap member, and a center pin extending through said bearing bore and engaging the loop means of the other strap member, and means for locking said center pin to the engaged loop means comprising radial end slot means in said center pin, aligned slot means in said engaged loop means, and spring clamp means extending into said slot means and clampingly secured to said loop means.

9. A belt connector comprising strap members having interengaging loop means, means for pivotally connecting said loop means comprising a bearing bushing with a transverse bearing bore in the loop means of one strap member, and a center pin extending through said bearing bore and engaging the loop means of the other strap member, and means for locking said center pin to the engaged loop means comprising radial end slot means in said center pin, aligned slot means in said engaged loop means, and spring yoke means embracing said engaged loop means, extending into said slot means and removably clamped to said engaged loop means.

10. In a belt connection, a pair of hingedly connected strap members provided with a pivot pin and locking means for maintaining said pin in place, said locking means consisting of a yieldable removable clamping member, flanges on each of said strap members engaging opposite sides of a belt end and having therein aligned wedge-shaped apertures with their enlarged ends disposed toward the hinge connection between said strap members, and fastening means of cross section similar to said apertures extending through said apertures and the respective belt ends, said fastening means each having an enlarged head at one end engaging one of said flanges and having the other end bent over upon the other flange of the strap member.

11. In a belt connector, a belt having an end portion, a pair of hingedly connected strap members, said members comprising a loop adapted to retain a center pivot pin, said strap member comprising flanges engaging opposite sides of said belt end portion and having therein aligned wedge-shaped apertures with their enlarged ends disposed toward the end of said belt end portion, and nails of wedge-shaped section extending through said belt and said apertures preventing rupture of the belt body adjacent said nails.

EDWARD H. KREMER.